United States Patent [19]

Waters

[11] 4,438,829
[45] Mar. 27, 1984

[54] EMERGENCY RESCUE BOX

[76] Inventor: Donald I. Waters, 3907 Forrest Park Ave., Baltimore, Md. 21207

[21] Appl. No.: 307,364

[22] Filed: Oct. 1, 1981

[51] Int. Cl.$^3$ .............................................. A62B 1/02
[52] U.S. Cl. .................................... 182/150; 182/142
[58] Field of Search ...................... 182/150, 142, 145; 244/137 R, 137 P

[56] References Cited

U.S. PATENT DOCUMENTS

| | | | |
|---|---|---|---|
| 337,940 | 3/1886 | Emons | 182/142 |
| 470,689 | 3/1892 | Lee | 182/145 |
| 1,557,075 | 10/1925 | Macleod | 182/145 |
| 3,771,750 | 11/1973 | Strayer | 244/137 P |
| 3,931,868 | 1/1976 | Smith | 182/145 |
| 4,355,699 | 10/1982 | Smith | 182/142 |

*Primary Examiner*—Reinaldo P. Machado
*Assistant Examiner*—Alvin C. Chin-Shue
*Attorney, Agent, or Firm*—John F. McClellan, Sr.

[57] ABSTRACT

Emergency apparatus in the form of a rescue box for air-lifting survivors from burning high-rise buildings; the rescue box has opposed full-width and full-height doors hinged at the bottom, which act as passenger loading ramps when open as when the rescue box is set down on the roof of a burning building and which on lifting by helicopters is safely held closed by lifting lines proportioned for sharing the load with other lines to the rescue box; each door has a smaller door in it hinged inward at the bottom to facilitate escape into the rescue box when positioned alongside burning buildings, as through windows in the buildings; aerodynamic stabilization for steadying the rescue box during transport and landing is provided by a tail extending from an end of the rescue box; special view limiting and cushioning features are also disclosed.

1 Claim, 3 Drawing Figures

EMERGENCY RESCUE BOX

FIELD OF THE INVENTION

This invention relates generally to life-saving apparatus and specifically to an air transportable rescue box of special design for removing people from burning buildings and carrying them to safety.

BACKGROUND OF THE INVENTION

Fires causing heavy loss of life in high-rise buildings are becoming more frequent because of two facts: the daily increasing numbers of high-rise buildings and the inability of ordinary fire equipment to rescue people from upper floors.

PRIOR ART

Helicopter-hoisted and carried boxes for cargo and the like are known, and apparatus for letting people escape from windows of burning buildings has been disclosed in conjunction with lowering lines.

OBJECTS OF THE INVENTION

However, it is believed that no fire-rescue system is presently available which is equipped for air transport and deployment, both on roof and at building-side rescue sites, which has automatic-door operation for roofs and has aerodynamic stabilization, and to provide such are principal objects of this invention.

Other objects are to provide a system as described which is light-weight but strong, easy and safe to use, confidence-inspiring for users, and shock absorbing on set-down.

BRIEF SUMMARY OF THE INVENTION

In brief summary given as cursive description only and not as limitation the invention includes a rectangular box with large loading doors and lifting lines co-acting to hold the large loading doors closed when in transport but to release them when set down; with small door provision for side-loading from a burning building; and with aerodynamic stabilization.

BRIEF DESCRIPTION OF THE DRAWINGS

The above and other objects and advantages of this invention will become more readily apparent on examination of the following drawings in which like reference numerals refer to like parts.

This box is designed exclusively for saving lives in case of fire in very high buildings where in most cases survivors are trapped above the fire out of reach of firemen and ordinary rescue equipment. In many cases this leaves only one choice: to reach the roof. With the assistance of a helicopter this box can be raised to the top of a burning building and set down on the roof, then, given the right amount of slack, both sides will open, allowing survivors to rush in the box. As the box is raised the sides are automatically closed. The box is carried through the air to a nearby building roof or any large place where it is safe to land.

The emergency rescue box should be made of light-weight metal. Seventy-five percent of the outside view may be blanked out to give fire survivors less field of view during the transferring to nearby buildings. This will keep down tension and excitement among survivors. This box should be 12 feet in length, 7 feet in height and 5 feet in width.

Preferably, special groups of men should be trained to ride in the rescue boxes, one man to each box. Each rescue box should preferably be equipped with a radio phone, keeping in contact with the pilot above in the helicopter. In some cases, working off sides of building, two men should be inside a rescue box, one man with a grab hook on a pole, to hold and keep box steady, while the other man helps survivors into the box. This operation should be practiced often to assure complete success, ironing out any problems that may occur in case of an emergency, and making the men feel more secure in the operation. The rescue box should be equipped with a tail, similar to an airplane, to keep the box steady and facing the direction the helicopter is traveling. In setting down, the tail will have the tendency to turn and face the rescue box into the wind, making it easier to set down. The resuce box should be equipped with rubber cushions on all four corners at the bottom to reduce and provide smoother set down.

DETAILED DESCRIPTION

Figure 1:
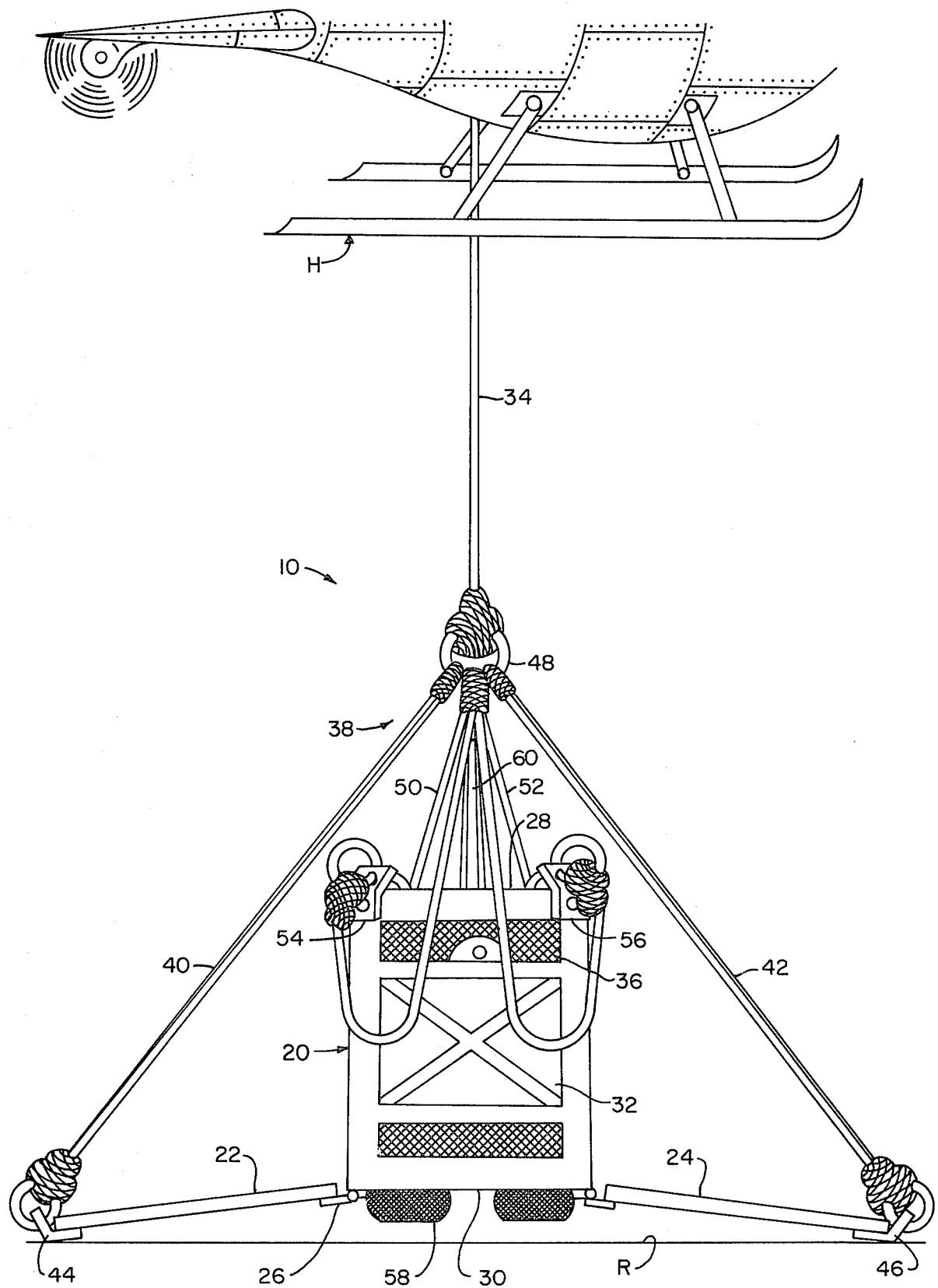
FIG. 1 is an end-elevational view of the invention coupled with a helicopter shown in perspective view.

FIG. 1 shows the invention 10 on a roof R. The rescue box 20 has floors 22, 24 that open as shown so that people fleeing from a fire can enter the rescue box from two sides at once. The doors form full-width and full height sides of the rescue box, to which they are hinged by a lower portion of each door as at 26, and the rescue box has enclosing top 28, bottom 30 and cross-braced end panels 32.

After the passengers are all inside, the rescue box 20 is transported by a helicopter H to the safety of a nearby roof or the ground where the passengers leave the rescue box. Meshlike open work 36 provides occupants of the rescue box with ventilation in a band extending around the rescue box at the top and bottom of each side and end. A central band of solid cross braced end panels 32 restricts view to keep the occupants calm.

The lifting means 34 which connect the rescue box and helicopter include respective lines 40, 42 attaching upper portions of the doors such as ring clips 44, 46 to a ring 48, which is means for securing all lines together over a central portion of the rescue box 20. Further lines as at 50, 52 join the upper parts of the ends such as ring clips 54, 56 to the rescue box, which are fixed to the means for securing 48.

Cushions 58 of rubber may be used to soften shock of set-down and to provide a more stabile base for the rescue box when resting on an uneven surface.

The line lengths are proportioned to permit the upper portion of the doors when pivoted open to rest on the roof R or other supporting surface. When the rescue box is hoisted up the proportions cause all lines to become taut and take an equal load, as shown in the next Figure, which also shows better the fin or tail 60 feature of the invention.

Figure 2:
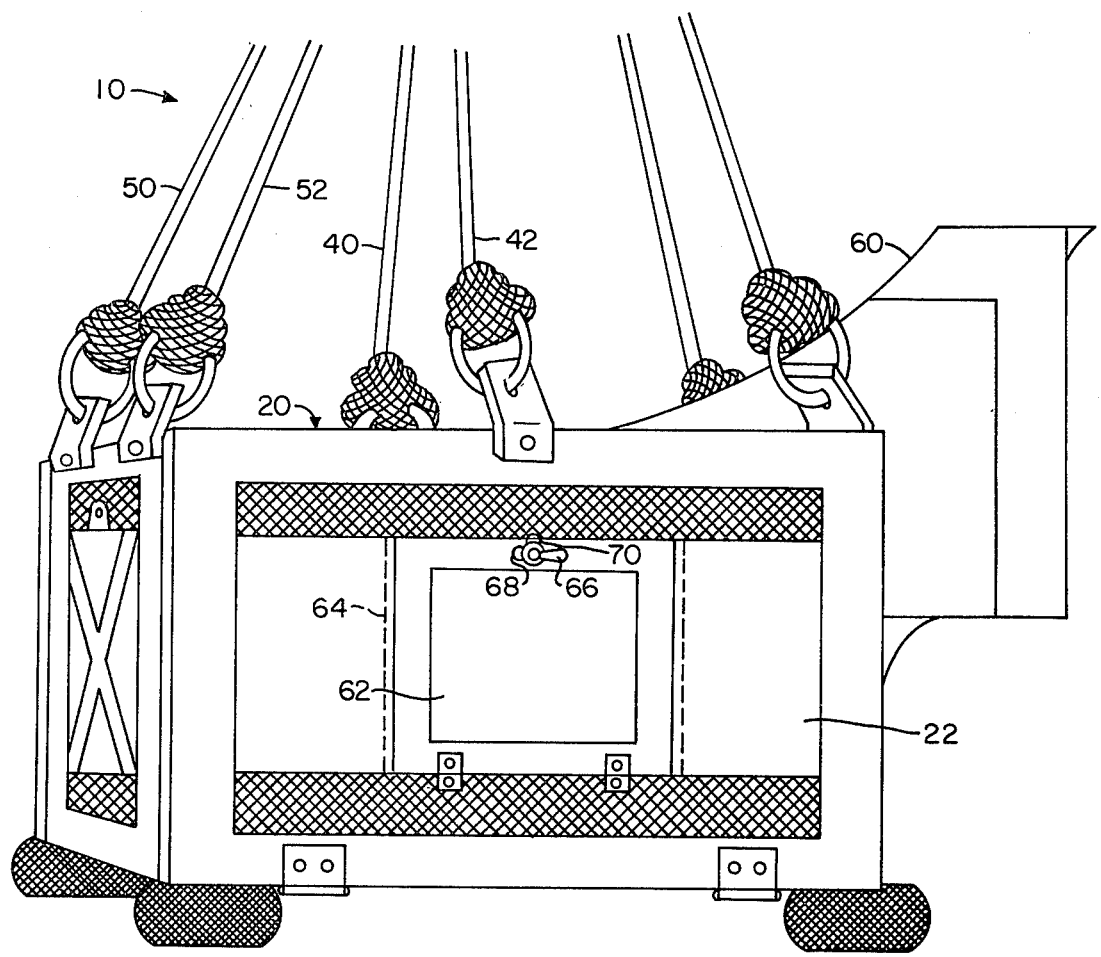
FIG. 2 is a perspective view of the invention in transport.

FIG. 2 shows further provisions of the invention mentioned above. As noted, when a helicopter lifts and carries the rescue box 20 all the lines, 40, 42, 50, 52 are taut and equally loaded. This closes the door 22 (24 on far side) and keeps the doors safely closed until the rescue box is again set-down. When the rescue box is set down the doors can open automatically because nothing restrains them and they are hinged at the inner edge. They again become occupant-ramps, aiding unloading and loading.

Tail 60 is fixed protruding outward along the long axis of the rescue box from one end and adjacent portions of the top. The tail 60 automatically turns the rescue box into the relative wind during transport and by preventing spinning inspires occupant confidence.

Each door, 22 shown, of the rescue box has a small door 62 or hatch in it for use in rescuing people from windows on the sides of buildings. These small doors hinge inwardly at a bottom portion, making a little ramp inside for passengers. Interior overlap 64 prevents the small doors from pivoting out. A handle 66 is provided on the exterior with an extension 68 to the interior to operate a closure latch 70 for each small door in rescue operations alongside buildings.

Figure 3:
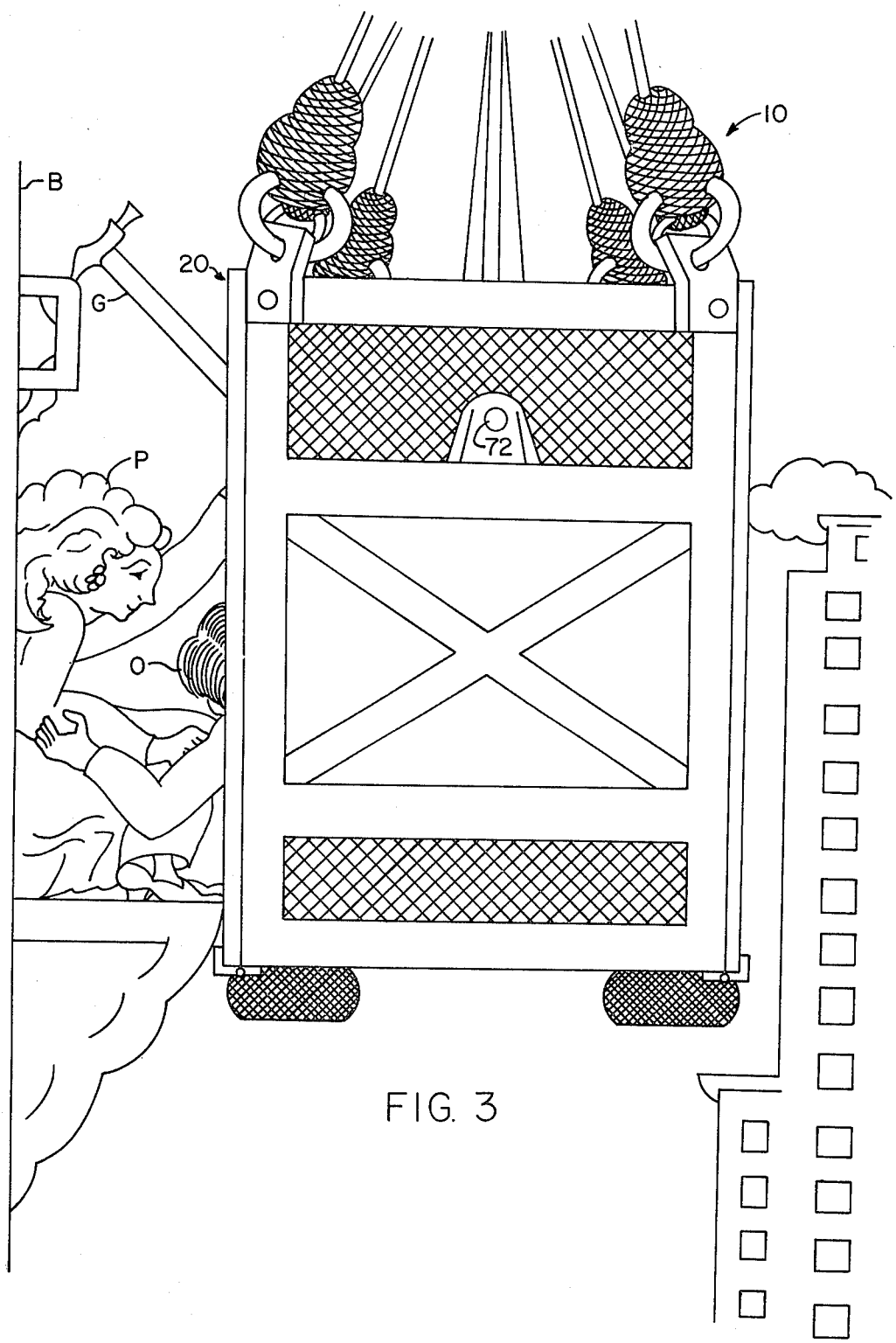
FIG. 3 is an end elevational view of the invention in a rescue operation alongside a building.

FIG. 3 shows the invention 10 in a rescue operation alongside a building B. A person P fleeing a fire is being helped to reach safety in the helicopter-supported rescue box 20 by another occupant 0, or a trained fireman. A hand-held grapnel G may be used to hold the rescue box steady.

Hand rails 72 are preferably provided in the rescue box for occupants to graps during transport.

The smaller doors can also be used for egress in restricted area or other unusual circumstances.

The rescue box is preferably of lightweight aluminum construction of the following dimensions: length 12 feet, height 7 feet, width 5 feet (3.6 by 2.1 by 1.4 m).

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for rescuing people from a burning highrise building having flat roofs and sides with openings for windows and the like, comprising: a rescue box of rectangular shape and with top, bottom, sides and ends, means for lifting the rescue box by a helicopter, first and second doors forming respective opposed upright sides of the rescue box, means hinging a lower edge of each of saids first and second doors to the rescue box permitting said first and second doors to swing outward and downward from the position in which they form said upright sides, means for securing said upright sides, in closed position when the rescue box is lifted comprising the means for lifting including a line attaching to an upper edge portion of each of said first and second doors, the means for lifting further including at least one line attaching to the rescue box adjacent each end of the rescue box, means for securing all said lines together at a central location over said rescue box, all said lines being proportioned in length for becoming taut when said rescue box is lifted; each of said first and second doors having a smaller door therein, means for opening said smaller doors inwardly into the rescue box, said means for opening said smaller doors inwardly including hinge means, attaching to a lower portion of a respective one of said first and second doors, means for aerodynamically stabilizing the rescue box comprising a fixed tail fin extending from one of said ends thereof, and means for cushioning said rescue box when set down after lifting.

* * * * *